United States Patent
Kohyama

(10) Patent No.: US 11,973,228 B2
(45) Date of Patent: Apr. 30, 2024

(54) NON-AQUEOUS ELECTROLYTE SECONDARY BATTERY

(71) Applicant: Prime Planet Energy & Solutions, Inc., Tokyo (JP)

(72) Inventor: Akira Kohyama, Toyoake (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 149 days.

(21) Appl. No.: 17/529,163

(22) Filed: Nov. 17, 2021

(65) Prior Publication Data

US 2022/0158239 A1    May 19, 2022

(30) Foreign Application Priority Data

Nov. 19, 2020    (JP) .................. 2020-192350

(51) Int. Cl.
- *H01M 4/62* (2006.01)
- *H01M 4/38* (2006.01)
- *H01M 4/44* (2006.01)
- *H01M 4/46* (2006.01)
- *H01M 10/052* (2010.01)
- *H01M 10/0567* (2010.01)
- *H01M 4/02* (2006.01)

(52) U.S. Cl.
CPC ............ *H01M 4/625* (2013.01); *H01M 4/38* (2013.01); *H01M 4/386* (2013.01); *H01M 4/387* (2013.01); *H01M 4/44* (2013.01); *H01M 4/463* (2013.01); *H01M 10/052* (2013.01); *H01M 10/0567* (2013.01); *H01M 2004/027* (2013.01); *H01M 2300/0025* (2013.01)

(58) Field of Classification Search
None
See application file for complete search history.

(56) References Cited

U.S. PATENT DOCUMENTS

| | | |
|---|---|---|
| 2011/0212359 A1 | 9/2011 | Dai et al. |
| 2013/0288112 A1 | 10/2013 | Ito et al. |
| 2016/0329560 A1 | 11/2016 | Young et al. |
| 2018/0269529 A1 | 9/2018 | Yuyama |
| 2019/0270876 A1 | 9/2019 | Tsutomu |
| 2020/0343560 A1 | 10/2020 | Ohta et al. |
| 2021/0083282 A1 | 3/2021 | Li |
| 2021/0242498 A1 | 8/2021 | Li et al. |
| 2021/0399344 A1 | 12/2021 | Hidaka et al. |

FOREIGN PATENT DOCUMENTS

| | | |
|---|---|---|
| CN | 101079510 | * 11/2007 |
| CN | 102124599 A | 7/2011 |
| CN | 102549820 A | 7/2012 |
| CN | 104245703 A | 12/2014 |

(Continued)

*Primary Examiner* — Laura Weiner
(74) *Attorney, Agent, or Firm* — HAUPTMAN HAM, LLP

(57) ABSTRACT

A non-aqueous electrolyte secondary battery includes a positive electrode, a negative electrode, and an electrolyte solution. The negative electrode includes a negative electrode composite material layer. The negative electrode composite material layer includes a negative electrode active material and a carbon nanotube. The electrolyte solution includes a solvent, a supporting electrolyte, and a cationic surfactant. The cationic surfactant includes a quaternary ammonium salt.

5 Claims, 3 Drawing Sheets

(56) References Cited

FOREIGN PATENT DOCUMENTS

| | | | |
|---|---|---|---|
| CN | 104795249 A | | 7/2015 |
| CN | 107154486 | * | 9/2017 |
| CN | 107710462 A | | 2/2018 |
| CN | 108140888 A | | 6/2018 |
| CN | 109119687 A | | 1/2019 |
| CN | 109309226 A | | 2/2019 |
| CN | 110265632 A | | 9/2019 |
| CN | 110875491 A | | 3/2020 |
| CN | 110914942 A | | 3/2020 |
| CN | 111244537 A | | 6/2020 |
| CN | 111864211 A | | 10/2020 |
| JP | 2007-281382 A | | 10/2007 |
| JP | 2013-235680 A | | 11/2013 |
| JP | 2014-160608 A | | 9/2014 |
| JP | 2014-179552 A | | 9/2014 |
| JP | 2017-228439 A | | 12/2017 |
| JP | 2018-008978 A | | 1/2018 |
| JP | 2019207797 A | | 12/2019 |
| JP | 2020-035587 A | | 3/2020 |
| WO | 2018/105338 A1 | | 6/2018 |
| WO | 2019/017375 A1 | | 1/2019 |
| WO | 2020/084828 A1 | | 4/2020 |
| WO | 2020/175522 A1 | | 9/2020 |

* cited by examiner

NON-AQUEOUS ELECTROLYTE SECONDARY BATTERY

This nonprovisional application is based on Japanese Patent Application No. 2020-192350 filed on Nov. 19, 2020, with the Japan Patent Office, the entire contents of which are hereby incorporated by reference.

BACKGROUND OF THE INVENTION

Field of the Invention

The present technique relates to a non-aqueous electrolyte secondary battery.

Description of the Background Art

Japanese Patent Laying-Open No. 2019-207797 discloses use of carbon nanotubes as a conductive material (see paragraph 0037, for example).

SUMMARY OF THE INVENTION

Research has been conducted on adding carbon nanotubes (CNTs) in a negative electrode composite material layer of a non-aqueous electrolyte secondary battery (which may be simply called "battery" hereinafter). The CNTs are expected to form electron conduction paths in the negative electrode composite material layer. Addition of the CNTs is expected to improve output properties, for example.

However, CNTs may have a very large specific surface area. Usually, the BET specific surface area of a negative electrode active material may range from about 1 m²/g to about 4 m²/g. On the other hand, the BET specific surface area of CNTs may range from about 250 m²/g to about 1250 m²/g. When CNTs are added to a negative electrode composite material layer, the reaction area in the negative electrode composite material layer may markedly increase. This may cause degradation of storage properties, for example.

Such an increase in reaction area caused by CNTs may be reduced by, for example, covering the CNTs with a protective material. For example, a negative electrode active material, CNTs, and a protective material may be mixed together during the process of forming a negative electrode composite material layer to achieve covering the CNTs with the protective material. When this method is employed, however, the protective material would be present between the negative electrode active material and the CNTs. In other words, contact points between the negative electrode active material and the CNTs may decrease. As a result, the function of the CNTs as electron conduction paths may be impaired and the output properties may be degraded.

An object of the technique according to the present application (herein also called "the present technique") is to improve output properties while reducing degradation of storage properties.

Hereinafter, the configuration and effects of the present technique will be described. It should be noted that the action mechanism according to the present technique includes presumption. The scope of the present technique should not be limited by whether or not the action mechanism is correct.

[1] A non-aqueous electrolyte secondary battery includes a positive electrode, a negative electrode, and an electrolyte solution. The negative electrode includes a negative electrode composite material layer. The negative electrode composite material layer includes a negative electrode active material and a carbon nanotube. The electrolyte solution includes a solvent, a supporting electrolyte, and a cationic surfactant. The cationic surfactant includes a quaternary ammonium salt.

In the battery according to the present technique, the electrolyte solution includes a cationic surfactant. The cationic surfactant includes a quaternary ammonium salt. Hereinafter, the cationic surfactant according to the present technique is also called "particular surfactant".

The particular surfactant according to the present technique may adsorb on the CNT to protect its surface. In other words, the particular surfactant may function as a protective material. When the particular surfactant protects the surface of the CNT, degradation of storage properties is expected to be reduced.

The particular surfactant according to the present technique may adsorb on the CNT within the battery. This configuration is expected to allow formation of contact points between the negative electrode active material and the CNT to proceed during negative electrode production, without being inhibited by the particular surfactant. When the CNT has many contact points with the negative electrode active material, output properties are expected to be improved.

Although the detailed mechanism is unclear, when an anionic surfactant, for example, is used instead of the particular surfactant (a cationic surfactant), degradation of storage properties can be enhanced.

[2] The quaternary ammonium salt may be represented by, for example, a formula (I):

$$CH_3(CR^6R^5R^4)(CH_2)_nN^+R^1R^2R^3 \cdot X^- \quad (I)$$

where each of $R^1$, $R^2$, and $R^3$ independently represents a hydrogen atom, a methyl group, an ethyl group, or a hydroxyethyl group; each of $R^4$, $R^5$, and $R^6$ independently represents a hydrogen atom, a methyl group, an ethyl group, a hydroxyethyl group, a carbonyl group, or an aminomethyl group; $X^-$ represents a halide ion, $PF_6^-$, or $BF_4^-$; and n represents an integer from 1 to 20.

[3] The negative electrode composite material layer may include the carbon nanotube in a mass fraction from 0.2% to 0.4%, for example.

[4] The negative electrode active material may include an alloy-based negative electrode active material, for example.

The alloy-based negative electrode active material tends to undergo a great extent of volume change (expanding and shrinking) during charge and discharge. There is a possibility that the electron conduction paths (the conductive material) cannot respond and follow the volume change of the alloy-based negative electrode active material, causing the electron conduction paths to break. As a result of this, cycle performance may be degraded, for example. The CNT may have a long and narrow shape. The CNT is expected to be capable of responding and following the volume change of the alloy-based negative electrode active material.

[5] The alloy-based negative electrode active material may include at least one selected from the group consisting of Si, Sn, Al, Cd, Sb, and Pb, for example.

[6] The alloy-based negative electrode active material may include a Si-containing material, for example.

The foregoing and other objects, features, aspects and advantages of the present technique will become more apparent from the following detailed description of the present technique when taken in conjunction with the accompanying drawings.

DESCRIPTION OF THE PREFERRED EMBODIMENTS

Next, an embodiment of the present technique (also called "the present embodiment" hereinafter) will be described. It should be noted that the below description does not limit the scope of the present technique.

In the present specification, expressions such as "comprise, include", "have", and the conjugations thereof (such as "be composed of", "encompass, involve", "contain", "carry, support", and "hold", for example) are open-ended expressions. In other words, each of these expressions includes a certain configuration but this configuration may not necessarily be the only configuration that is included. The expression "consist of" is a closed-end expression. The expression "consist essentially of" is a semiclosed-end expression. In other words, the expression "consist essentially of" means that an additional component may also be included in addition to an essential component or components, unless an object of the present technique is impaired. For example, a component that is usually expected to be included in the relevant field to which the present technique pertains (such as inevitable impurities, for example) may be included as an additional component.

In the present specification, a singular form ("a", "an", and "the") also includes its plural meaning, unless otherwise specified. For example, "a particle" may include not only "a single particle" but also "a group of particles (powder)".

In the present specification, when a compound is represented by a stoichiometric composition formula such as "$LiCoO_2$", this stoichiometric composition formula is merely a typical example. The composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified.

In the present specification, a numerical range such as "from 0.2% to 0.4%" includes both the upper limit and the lower limit, unless otherwise specified. For example, "from 0.2% to 0.4%" means a numerical range of "not less than 0.2% and not more than 0.4%". Moreover, any numerical value selected from the numerical range may be used as a new upper limit and/or a new lower limit. For example, any numerical value within the numerical range and any numerical value described in another location of the present specification may be combined to create a new numerical range.

The dimensional relationship in each figure may not necessarily coincide with the actual dimensional relationship. The dimensional relationship (in length, width, thickness, and the like) in each figure may have been changed for the purpose of assisting the understanding of the present technique. Further, a certain configuration may be partially omitted.

<Non-Aqueous Electrolyte Secondary Battery>

Figure 1:
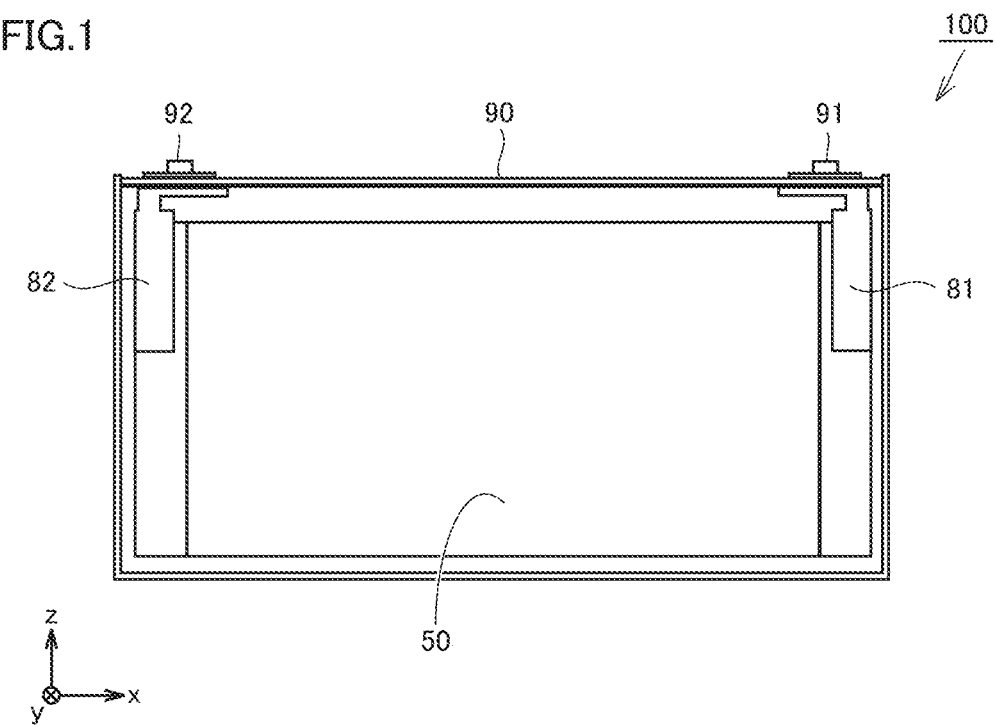
FIG. 1 is a schematic view illustrating an example of a non-aqueous electrolyte secondary battery according to the present embodiment.

FIG. 1 is a schematic view illustrating an example of a non-aqueous electrolyte secondary battery according to the present embodiment.

A battery 100 may be used for any application. For example, battery 100 may be used as a main electric power supply or a motive force assisting electric power supply in an electric vehicle. A plurality of batteries 100 may be connected together to form a battery module or a battery pack.

Battery 100 includes a housing 90. Housing 90 is prismatic (a flat, rectangular parallelepiped). However, prismatic is merely an example. Housing 90 may be cylindrical or may be a pouch, for example. Housing 90 may be made of an Al (aluminum) alloy, for example. Housing 90 accommodates an electrode assembly 50 and an electrolyte solution (not illustrated). Electrode assembly 50 is connected to a positive electrode terminal 91 via a positive electrode current-collecting member 81. Electrode assembly 50 is connected to a negative electrode terminal 92 via a negative electrode current-collecting member 82.

Figure 2:
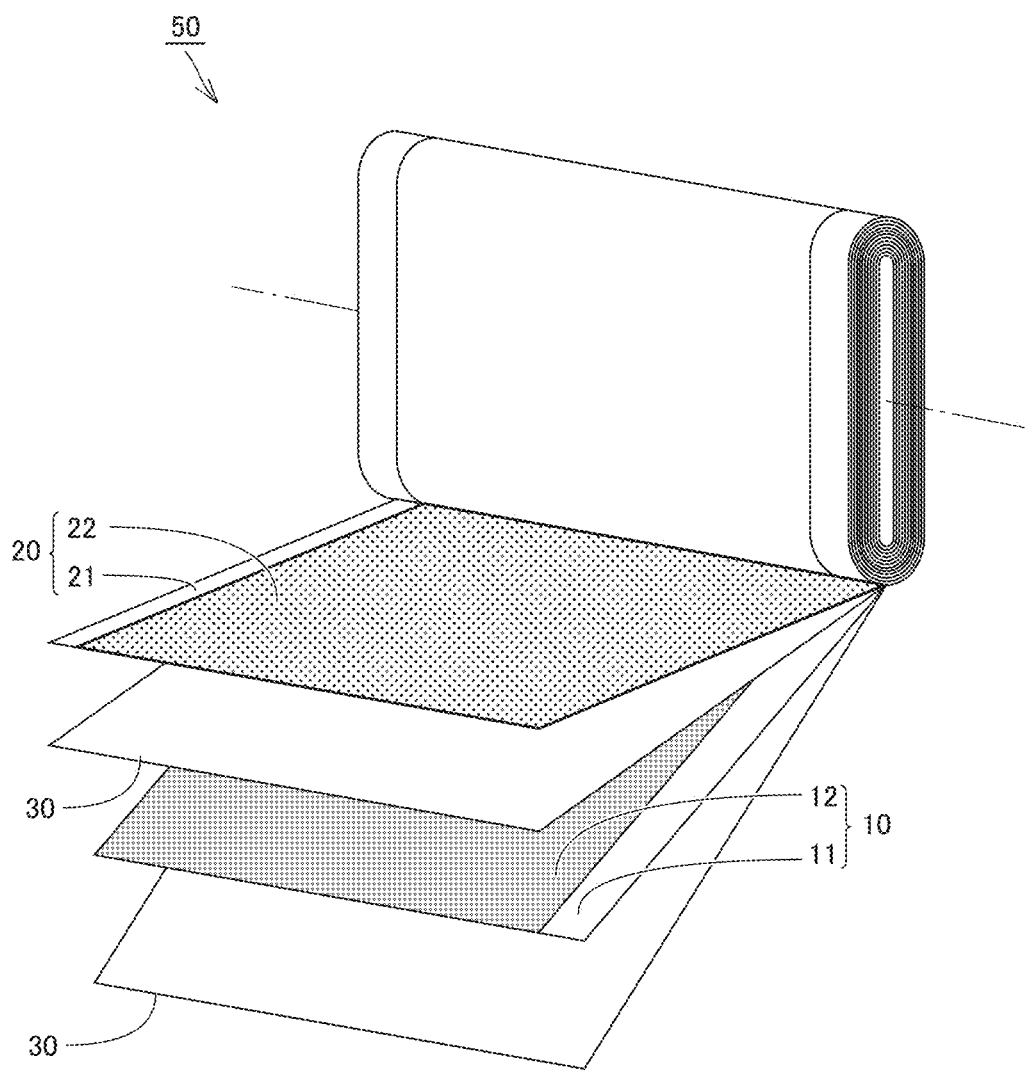
FIG. 2 is a schematic view illustrating an example of an electrode assembly according to the present embodiment.

FIG. 2 is a schematic view illustrating an example of an electrode assembly according to the present embodiment.

Electrode assembly 50 is a wound-type one. Electrode assembly 50 includes a positive electrode 10, a separator 30, and a negative electrode 20. In other words, battery 100 includes positive electrode 10, negative electrode 20, and an electrolyte solution. Each of positive electrode 10, separator 30, and negative electrode 20 is a belt-shaped sheet. Electrode assembly 50 may include a plurality of separators 30. Electrode assembly 50 is formed by stacking positive electrode 10, separator 30, and negative electrode 20 in this order and then winding them spirally. One of positive electrode 10 and negative electrode 20 may be interposed between separators 30. Both positive electrode 10 and negative electrode 20 may be interposed between separators 30. After the winding, electrode assembly 50 is shaped into a flat form. The wound-type one is merely an example. Electrode assembly 50 may be a stack-type one, for example.

<<Electrolyte Solution>>

At least part of the electrolyte solution is used to impregnate electrode assembly 50. The entire electrolyte solution may be used to impregnate electrode assembly 50. A part of the electrolyte solution may be used to impregnate electrode assembly 50. A part of the electrolyte solution may be stored outside electrode assembly 50 (at the bottom of housing 90), for example.

The electrolyte solution is a liquid electrolyte. The electrolyte solution according to the present embodiment includes a solvent, a supporting electrolyte, and a particular surfactant. In addition to these components, the electrolyte solution may further include an optional additive and/or the like.

(Solvent)

The solvent is aprotic. The solvent may include an optional component. The solvent may include, for example, at least one selected from the group consisting of ethylene carbonate (EC), propylene carbonate (PC), butylene carbonate (BC), monofluoroethylene carbonate (FEC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

(Supporting Electrolyte)

The supporting electrolyte is dissolved in the solvent. The supporting electrolyte may include, for example, at least one selected from the group consisting of $LiPF_6$, $LiBF_4$, and $LiN(FSO_2)_2$. The molarity of the supporting electrolyte may be from 0.5 mol/L to 2.0 mol/L, for example. The molarity of the supporting electrolyte may be from 0.8 mol/L to 1.2 mol/L, for example.

(Particular Surfactant)

The electrolyte solution includes a particular surfactant. The electrolyte solution may include the particular surfactant in a mass fraction (mass concentration) from 1% to 2%, for example. When the electrolyte solution includes a plurality of the particular surfactants, the mass fraction of the particular surfactant refers to the sum of the mass fractions of all the particular surfactants.

The particular surfactant may be dissolved in the solvent, or may be dispersed in the solvent. The particular surfactant may protect the surface of the CNT included in negative electrode 20. By this, degradation of storage properties is expected to be reduced. Further, in the present embodiment, it is less likely that the particular surfactant inhibits the formation of contact points between the CNT and the negative electrode active material. As a result, output properties are expected to be improved.

Figure 3:
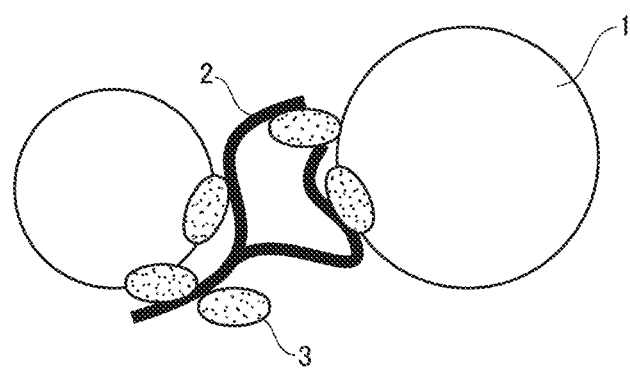
FIG. 3 is a conceptual view illustrating the positions of a negative electrode active material, a CNT, and a particular surfactant according to a reference embodiment.

FIG. 3 is a conceptual view illustrating the positions of a negative electrode active material, a CNT, and a particular surfactant according to a reference embodiment. For example, negative electrode 20 may be produced by the procedure described below. A negative electrode active material 1, a CNT 2, a particular surfactant 3, a binder (not illustrated), and a dispersion medium are mixed to prepare a negative electrode composite material slurry. The negative electrode composite material slurry is applied to a surface of a negative electrode substrate 21 to form a negative electrode composite material layer 22. In a reference embodiment, in the negative electrode composite material slurry, particular surfactant 3 may adsorb on a surface of CNT 2. This results in particular surfactant 3 to be partially interposed between CNT 2 and negative electrode active material 1. In other words, contact points between CNT 2 and negative electrode active material 1 decrease. As a result, output properties may degrade.

Figure 4:
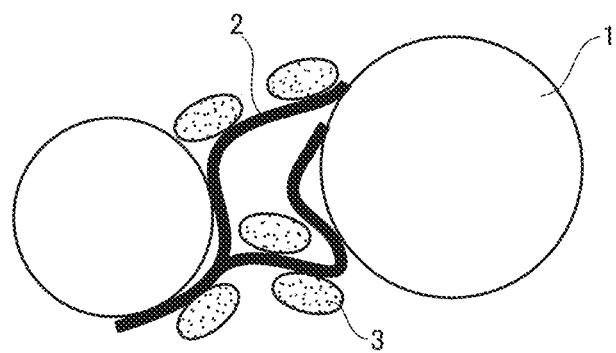
FIG. 4 is a conceptual view illustrating the positions of a negative electrode active material, a CNT, and a particular surfactant according to the present embodiment.

FIG. 4 is a conceptual view illustrating the positions of a negative electrode active material, a CNT, and a particular surfactant according to the present embodiment. In the present embodiment, an electrolyte solution includes particular surfactant 3. Negative electrode active material 1, CNT 2, a binder (not illustrated), and a dispersion medium may be mixed to prepare a negative electrode composite material slurry. The negative electrode composite material slurry does not include particular surfactant 3. Therefore, in the negative electrode composite material slurry, CNT 2 may cling directly to negative electrode active material 1 and thereby many contact points may be formed between CNT 2 and negative electrode active material 1. The negative electrode composite material slurry is applied to a surface of negative electrode substrate 21 to form negative electrode composite material layer 22. Subsequently, the electrolyte solution is injected into battery 100, and thereby, within battery 100, negative electrode composite material layer 22 comes into contact with the electrolyte solution. Therefore, it is expected that the particular surfactant 3 does not substantially inhibit the formation of contact points between CNT 2 and negative electrode active material 1. It is expected that particular surfactant 3 in the electrolyte solution may adsorb on the exposed part of CNT 2 and thereby degradation of storage properties may be reduced.

The particular surfactant is a cationic surfactant. The particular surfactant includes a quaternary ammonium salt. The particular surfactant may consist essentially of a quaternary ammonium salt. The particular surfactant may be a homopolymer or may be a copolymer, for example. The particular surfactant may be an oligomer or may be a polymer, for example.

The quaternary ammonium salt may be represented by, for example, a formula (I):

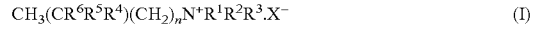
$$CH_3(CR^6R^5R^4)(CH_2)_nN^+R^1R^2R^3 \cdot X^- \quad (I)$$

In the formula (I), each of $R^1$, $R^2$, and $R^3$ independently represents a hydrogen atom (—H), a methyl group (—$CH_3$), an ethyl group (—$C_2H_5$), or a hydroxyethyl group (—$C_2H_4OH$); and each of $R^4$, $R^5$, and $R^6$ independently represents a hydrogen atom, a methyl group, an ethyl group, a hydroxyethyl group, a carbonyl group (—C(=O)—), or an aminomethyl group (—$CH_2NH_2$).

In the formula (I), n represents an integer from 1 to 20. n may represent an integer from 4 to 14, for example. n may represent an integer from 6 to 12, for example.

In the formula (I), $X^-$ represents a halide ion, $PF_6^-$, or $BF_4^-$. For example, $X^-$ may be the same type of anion as a counter anion of the supporting electrolyte. When the supporting electrolyte is $LiPF_6$, for example, $X^-$ may be $PF_6^-$. The halide ion may include, for example, at least one selected from the group consisting of $F^-$, $Cl^-$, $Br^-$, and $I^-$.

The quaternary ammonium salt may be represented by, for example, a formula (II):

$$CH_3(CH_2)_nN^+(CH_3)_3 \cdot PF_6^- \quad (II)$$

In the formula (II), n may represent an integer from 2 to 20, for example; or n may represent an integer from 5 to 15, for example.

The quaternary ammonium salt may include, for example, at least one selected from the group consisting of hexyltrimethylammonium hexafluorophosphate and hexadecyltrimethylammonium hexafluorophosphate.

The quaternary ammonium salt may have a number average molecular weight (Mn) from 200 to 6000, for example. The quaternary ammonium salt may have a weight average molecular weight (Mw) from 300 to 8000, for example. The number average molecular weight (Mn) and the weight average molecular weight (Mw) may be measured by GPC (gel permeation chromatography).

<<Negative Electrode>>

Negative electrode 20 includes negative electrode composite material layer 22. Negative electrode 20 may further include negative electrode substrate 21. For example, negative electrode composite material layer 22 may be placed on a surface of negative electrode substrate 21. Negative electrode composite material layer 22 may be formed on only one side of negative electrode substrate 21. Negative electrode composite material layer 22 may be formed on both sides of negative electrode substrate 21. Negative electrode substrate 21 is a conductive sheet. Negative electrode substrate 21 may include, for example, a Cu (copper) foil and/or the like. Negative electrode substrate 21 may have a thickness from 5 μm to 30 μm, for example.

Negative electrode composite material layer 22 may have a thickness from 10 μm to 100 μm, for example. Negative electrode composite material layer 22 includes a negative electrode active material and a CNT. Negative electrode composite material layer 22 may further include a binder, for example. Negative electrode composite material layer 22 may further include a conductive material other than CNT. Negative electrode composite material layer 22 may consist essentially of a negative electrode active material, a CNT, a conductive material other than CNT, and a binder.

(CNT)

The CNT forms electron conduction paths inside negative electrode composite material layer 22. The CNT may have a long and narrow shape. The CNT may cling to the negative electrode active material (particles) to form electron conduction paths. Even when the negative electrode active material greatly expands and shrinks, for example, the electron conduction paths formed by the CNT are expected to be less likely to break. A negative electrode active material that undergoes a great extent of volume change may include an alloy-based negative electrode active material (described below), for example.

The CNT may include, for example, at least one selected from the group consisting of SWNT (single-walled carbon nanotube), DWNT (double-walled carbon nanotube), and MWNT (multi-walled carbon nanotube).

The CNT may have an average length from 0.5 μm to 40 μm, for example. The "average length" is the arithmetic mean of the lengths of one hundred or more CNTs. The length of individual CNTs may be measured in a TEM (transmission electron microscope) image or an SEM (scanning electron microscope) image, for example. The CNT may have an average diameter of 20 nm or less, for example. The CNT may have an average diameter from 1 nm to 20 nm, for example. The "average diameter" is the arithmetic mean of the diameters of one hundred or more CNTs. The diameter of individual CNTs may also be measured in a TEM image or an SEM image, for example.

Negative electrode composite material layer 22 may include the CNT in a mass fraction from 0.01% to 3%, for example. Negative electrode composite material layer 22 may include the CNT in a mass fraction from 0.2% to 0.4%, for example. Within these ranges, output properties, cycle performance, and the like are expected to be enhanced.

(Relationship in Quantity Between CNT and Particular Surfactant)

The ratio of the mass fraction of the particular surfactant in the electrolyte solution to the mass fraction of the CNT in negative electrode composite material layer 22 may be from 0.1 to 0.5, for example. This ratio may be from 0.1 to 0.4, or may be from 0.1 to 0.2, or may be from 0.2 to 0.4, for example. Within these ranges, a good balance tends to be achieved between output properties and storage properties.

(Additional Conductive Material)

In the present specification, "an additional conductive material" refers to a conductive material other than CNT. Negative electrode composite material layer 22 may further include an additional conductive material as long as it includes the CNT. The additional conductive material may include, for example, at least one selected from the group consisting of carbon black (such as acetylene black, for example) and graphene flakes. Negative electrode composite material layer 22 may include the additional conductive material in a mass fraction from 0.1% to 10%, for example.

(Negative Electrode Active Material)

The negative electrode active material may be powder, for example. The negative electrode active material may have a D50 from 1 μm to 30 μm, for example. The "D50" in the present specification refers to a particle size in volume-based particle size distribution at which the cumulative particle volume (accumulated from the side of small sizes) reaches 50% of the total particle volume. The D50 may be measured with a laser-diffraction particle size distribution analyzer.

Negative electrode composite material layer 22 may include the negative electrode active material in a mass fraction from 80% to 99%, for example. Negative electrode composite material layer 22 may include the negative electrode active material in a mass fraction from 95% to 98%, for example.

The negative electrode active material may include, for example, an alloy-based negative electrode active material. For example, the negative electrode active material may consist essentially of an alloy-based negative electrode active material. The alloy-based negative electrode active material may have a large specific capacity. When an alloy-based negative electrode active material is used, energy density is expected to be enhanced. However, an alloy-based negative electrode active material tends to undergo a great extent of volume change during charge and discharge. So, there is a possibility that electron conduction paths formed with carbon black and the like may not be capable of responding or following the volume change of the alloy-based negative electrode active material, leading to a break. In the present embodiment, electron conduction paths are formed with CNT. It is expected that the CNT may be capable of responding and following the volume change of the alloy-based negative electrode active material.

(Alloy-Based Negative Electrode Active Material)

The alloy-based negative electrode active material may occlude Li (lithium) via alloying reaction and release Li via dealloying reaction. The alloy-based negative electrode active material may include, for example, at least one selected from the group consisting of Si (silicon), Sn (tin), Al (aluminum), Cd (cadmium), Sb (antimony), and Pb (lead). Si is one of the materials that hold great promise. Various Si-containing materials may function as the negative electrode active material. In other words, the negative electrode active material may include a Si-containing material.

The "Si-containing material" in the present specification refers to a material that contains Si. As long as it contains Si, the Si-containing material may further include an additional component. The Si-containing material may consist essentially of Si metal (the elemental Si), for example. The Si-containing material may include a Si-based alloy, for example. The Si-containing material may include, for example, at least one selected from the group consisting of SiCu alloy, SiNi alloy, SiAl alloy, and SiZn alloy. The Si-containing material may include a Si compound, for example. The Si-containing material may include a Si oxide, for example. The Si-containing material may include $SiO_x$ ($0.5 \leq x \leq 1.5$), for example. The Si-containing material may include a composite material of Si and other materials, for example. The Si-containing material may include a Si/C composite material, for example. The Si/C composite material may be a carbon material (such as graphite and/or amorphous carbon) carrying Si metal, Si oxide, and/or the like, for example. The Si-containing material may include, for example, at least one selected from the group consisting of Si metal, Si-based alloy, Si oxide, and Si/C composite material.

(Carbon-Based Negative Electrode Active Material)

The negative electrode active material may include a carbon-based negative electrode active material, for example. The negative electrode active material may consist essentially of a carbon-based negative electrode active material, for example. The carbon-based negative electrode active material may include, for example, at least one selected from the group consisting of graphite, soft carbon, and hard carbon.

The negative electrode active material may include both the alloy-based negative electrode active material and the carbon-based negative electrode active material, for example. The carbon-based negative electrode active material tends to be superior to the alloy-based negative electrode active material in cycle performance, for example. When the negative electrode active material includes both the alloy-based negative electrode active material and the carbon-based negative electrode active material, a good balance between energy density and cycle performance is expected to be achieved, for example. The mass ratio of the alloy-based negative electrode active material and the carbon-based negative electrode active material may be "(alloy-based negative electrode active material)/(carbon-based negative electrode active material)=1/99 to 99/1", or may be "(alloy-based negative electrode active material)/(carbon-based negative electrode active material)=10/90 to 90/10", or may be "(alloy-based negative electrode active material)/(carbon-based negative electrode active material)=30/70 to 70/30", for example.

(Binder)

Negative electrode composite material layer 22 may further include a binder. The binder may include an optional component. The binder may include at least one selected from the group consisting of carboxymethylcellulose (CMC), styrene-butadiene rubber (SBR), polyacrylic acid (PAA), and polyimide (PI), for example. Negative electrode composite material layer 22 may include the binder in a mass fraction from 0.1% to 10%, for example.

<<Positive Electrode>>

Positive electrode 10 includes a positive electrode composite material layer 12. Positive electrode 10 may further include a positive electrode substrate 11. For example, positive electrode composite material layer 12 may be placed on a surface of positive electrode substrate 11. Positive electrode composite material layer 12 may be placed on only one side of positive electrode substrate 11. Positive electrode composite material layer 12 may be placed on both sides of positive electrode substrate 11. Positive electrode substrate 11 is a conductive sheet. Positive electrode substrate 11 may include an Al foil and/or the like, for example. Positive electrode substrate 11 may have a thickness from 10 µm to 30 µm, for example.

Positive electrode composite material layer 12 may have a thickness from 10 µm to 100 µm, for example. Positive electrode composite material layer 12 may include a positive electrode active material, a conductive material, and a binder. For example, positive electrode composite material layer 12 may consist essentially of a positive electrode active material, a conductive material, and a binder. For example, positive electrode composite material layer 12 may consist of the positive electrode active material in a mass fraction from 80% to 99.8%, the conductive material in a mass fraction from 0.1% to 10%, and the binder in a mass fraction from 0.1% to 10%. The positive electrode active material may include an optional component.

The positive electrode active material may include at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$, for example. Here, the expression "(NiCoMn)" in the composition formula "$Li(NiCoMn)O_2$", for example, means that the constituents within the parentheses are collectively regarded as a single unit in the entire composition ratio. The conductive material may include an optional component. The conductive material may include acetylene black and/or the like, for example. The binder may include an optional component. The binder may include polyvinylidene difluoride (PVdF) and/or the like, for example.

<<Separator>>

At least part of separator 30 is interposed between positive electrode 10 and negative electrode 20. Separator 30 separates positive electrode 10 from negative electrode 20. Separator 30 may have a thickness from 10 µm to 30 µm, for example.

Separator 30 is porous. Separator 30 allows permeation of the electrolyte solution therethrough. Separator 30 may have an air permeability from 200 s/100 mL to 400 s/100 mL, for example. The "air permeability" in the present specification refers to the "air resistance" defined in "JIS P8117:2009". The air permeability is measured by a Gurley test method.

Separator 30 is electrically insulating. Separator 30 may include a polyolefin-based resin, for example. Separator 30 may consist essentially of a polyolefin-based resin, for example. The polyolefin-based resin may include, for example, at least one selected from the group consisting of polyethylene (PE) and polypropylene (PP). Separator 30 may have a monolayer structure, for example. Separator 30 may consist essentially of a PE layer, for example. Separator 30 may have a multilayer structure, for example. Separator 30 may be formed by, for example, stacking a PP layer, a PE layer, and a PP layer in this order. On a surface of separator 30, a heat-resistant layer and/or the like, for example, may be formed.

Examples

Next, examples according to the present technique (hereinafter also called "the present example") will be described. It should be noted that the below description does not limit the scope of the present technique.

<Production of Non-Aqueous Electrolyte Secondary Battery>

Batteries for evaluation use (also called "evaluation batteries") (non-aqueous electrolyte secondary batteries) No. 1 to No. 15 were produced in the below manner.

(Preparation of Positive Electrode)

The below materials were prepared.

Positive electrode active material: $Li(Ni_{1/3}CO_{1/3}Mn_{1/3})O_2$

Conductive material: acetylene black

Binder: PVdF

Dispersion medium: N-methyl-2-pyrrolidone

Positive electrode substrate: Al foil

The positive electrode active material, the conductive material, the binder, and the dispersion medium were mixed to prepare a positive electrode composite material slurry. The solid matter ratio (in mass) was "(positive electrode active material)/(conductive material)/binder=87/10/3". The positive electrode composite material slurry was applied to a surface of the positive electrode substrate to form a positive electrode composite material layer. The positive electrode composite material layer was compressed. In this way, a positive electrode was prepared.

(Preparation of Negative Electrode)

The below materials were prepared.

Alloy-based negative electrode active material: Si-containing material (D50=15 µm)

Carbon-based negative electrode active material: natural-graphite-based material (D50=20 µm)

CNT: MWNT (average length=10 µm)

Additional conductive material: acetylene black

Binder: CMC, SBR

Surfactant: A, B, C (see Table 1 below)

Dispersion medium: water
Negative electrode substrate: Cu foil

Part of the surfactants in the present example was a commercially available product. Part of the surfactants in the present example was prepared by ion-exchange treatment of a commercially available product. In the ion-exchange treatment, Br⁻ may be replaced by $PF_6^-$, for example. Surfactants A and B in the present example were cationic surfactants. Surfactant C was an anionic surfactant.

The alloy-based negative electrode active material and the carbon-based negative electrode active material were mixed in a predetermined mass ratio to prepare a negative electrode active material (mixed powder).

The negative electrode active material, the CNT, the additional conductive material, the binder, the surfactant, and the dispersion medium were mixed to prepare a negative electrode composite material slurry. The negative electrode composite material slurry was applied to a surface of the negative electrode substrate to form a negative electrode composite material layer. The negative electrode composite material layer was compressed. In this way, a negative electrode was prepared. The mass fractions of the CNT and the surfactant in the negative electrode composite material layer were provided in Table 1 below.

(Electrolyte Solution)

An electrolyte solution was prepared. The electrolyte solution included the below components. The mass fraction of the surfactant in the electrolyte solution is provided in Table 1 below.

Solvent: "FEC/EC/EMC=1/2/7 (volume ratio)"
Supporting electrolyte: $LiPF_6$ (molarity=1.0 mol/L)
Surfactant: A, B, C (Assembling)

A separator was prepared. The separator had a three-layer structure. The three-layer structure consisted of a PP layer, a PE layer, and a PP layer. The separator had an air permeability of 300 s/100 mL.

The positive electrode, the separator, and the negative electrode were stacked so that the positive electrode faced the negative electrode with the separator interposed therebetween. In this way, an electrode assembly was formed. A housing was prepared. The housing was a pouch made of an Al-laminated film. The electrode assembly was placed in the housing. The electrolyte solution was injected into the housing. The housing was hermetically sealed. In this way, an evaluation battery was assembled.

(Activation Treatment)

In a thermostatic chamber set at 25° C., by charging in a constant-current mode at 0.3 It, an evaluation battery was charged to 4.1 V. Then, by discharging in a constant-current mode at 0.3 It, the evaluation battery was discharged to 3 V. This sequence of charging and discharging was repeated three times. "It" is a symbol representing an electric current hour rate. With an electric current of 1 It, the design capacity of an evaluation battery is discharged in one hour.

(Measurement of Initial Capacity)

After the activation treatment, the evaluation battery was charged in a constant current-constant voltage mode to its full capacity. The electric current of the constant-current charging was 0.2 It. The voltage of the constant-voltage charging was 4.1 V. The constant-voltage charging was terminated when the electric current attenuated to reach 0.02 It. Then, by discharging in a constant-current mode at 0.3 It, the evaluation battery was discharged to 3.0 V, and thereby the initial capacity (discharged capacity) was measured.

<Evaluation>

<<Initial Direct-Current Resistance>>

The voltage of the evaluation battery was adjusted to 3.705 V. In a thermostatic chamber set at 25° C., the evaluation battery was discharged for 30 seconds at an electric current of 0.5 It. The amount of voltage drop caused in the ten seconds following the start of discharging was measured. From the amount of voltage drop and the discharge current, the direct-current resistance was calculated.

<<Storage Capacity Retention>>

The voltage of the evaluation battery was adjusted to 4.1 V. In a thermostatic chamber set at 60° C., the evaluation battery was stored for 40 days. After 40 days, a post-storage capacity was measured under the same conditions as for the initial capacity. The post-storage capacity was divided by the pre-storage capacity, and thereby a storage capacity retention was calculated.

<<Cycle Capacity Retention>>

In a thermostatic chamber set at 25° C., 300 cycles of charging and discharging were carried out. A single cycle consisted of a single sequence of "Charging→First rest→Discharging→Second rest" as specified below. The discharged capacity of the 300th cycle was divided by the discharged capacity of the 1st cycle, and thereby a cycle capacity retention was calculated.

Charging: Constant-current mode, Current=0.5 It, Cutoff voltage=4.1 V
First rest: 10 minutes
Discharge: Constant-current mode, Current=0.5 It, Cutoff voltage=3.0 V
Second rest: 10 minutes

TABLE 1

| No. | CNT Negative electrode composite material layer Mass fraction % | Surfactant A [1] Negative electrode composite material layer Mass fraction % | Surfactant A [1] Electrolyte solution Mass fraction % | Surfactant B [2] Negative electrode composite material layer Mass fraction % | Surfactant B [2] Electrolyte solution Mass fraction % | Surfactant C [3] Negative electrode composite material layer Mass fraction % | Surfactant C [3] Electrolyte solution Mass fraction % | Initial direct-current resistance 25° C. Ω | Storage capacity retention 60° C. % | Cycle capacity retention 25° C. % |
|---|---|---|---|---|---|---|---|---|---|---|
| 1 | — | — | — | — | — | — | — | 2.00 | 80.2 | 36.0 |
| 2 | 0.2 | — | — | — | — | — | — | 1.67 | 63.4 | 68.0 |
| 3 | 0.4 | — | — | — | — | — | — | 1.45 | 43.8 | 81.2 |
| 4 | 0.2 | 1 | — | — | — | — | — | 2.67 | 75.6 | 66.8 |
| 5 | 0.2 | 2 | — | — | — | — | — | 3.05 | 78.9 | 68.9 |
| 6 | 0.4 | 1 | — | — | — | — | — | 2.23 | 54.3 | 80.3 |
| 7 | 0.4 | 2 | — | — | — | — | — | 2.59 | 72.3 | 79.8 |

TABLE 1-continued

| | CNT | Surfactant A [1] | | Surfactant B [2] | | Surfactant C [3] | | | | |
|---|---|---|---|---|---|---|---|---|---|---|
| No. | Negative electrode composite material layer Mass fraction % | Negative electrode composite material layer Mass fraction % | Electrolyte solution Mass fraction % | Negative electrode composite material layer Mass fraction % | Electrolyte solution Mass fraction % | Negative electrode composite material layer Mass fraction % | Electrolyte solution Mass fraction % | Initial direct-current resistance 25° C. Ω | Storage capacity retention 60° C. % | Cycle capacity retention 25° C. % |
| 8 | 0.2 | — | 1 | — | — | — | — | 1.70 | 76.1 | 67.2 |
| 9 | 0.2 | — | 2 | — | — | — | — | 1.76 | 79.4 | 69.3 |
| 10 | 0.4 | — | 1 | — | — | — | — | 1.51 | 60.2 | 82.1 |
| 11 | 0.4 | — | 2 | — | — | — | — | 1.58 | 76.8 | 81.5 |
| 12 | 0.4 | — | — | 2 | — | — | — | 3.42 | 59.4 | 78.4 |
| 13 | 0.4 | — | — | — | 2 | — | — | 1.82 | 63.4 | 79.3 |
| 14 | 0.4 | — | — | — | — | 2 | — | 1.89 | 39.4 | 75.4 |
| 15 | 0.4 | — | — | — | — | — | 2 | 1.56 | 37.6 | 74.5 |

[1] Hexyltrimethylammonium hexafluorophosphate (cationic, quaternary ammonium salt)
[2] Hexadecyltrimethylammonium hexafluorophosphate (cationic, quaternary ammonium salt)
[3] Lithium hexadecylsulfonate (anionic, sulfonic acid salt)

<Results>

For No. 1 to No. 3, the higher the mass fraction of the CNT in the negative electrode composite material layer was, the lower the initial direct-current resistance tended to be. In other words, the higher the mass fraction of the CNT in the negative electrode composite material layer was, the more enhanced the output properties tended to be. It is considered that the CNT formed electron conduction paths.

For No. 1 to No. 3, the higher the mass fraction of the CNT in the negative electrode composite material layer was, the higher the cycle capacity retention tended to be. In other words, the higher the mass fraction of the CNT in the negative electrode composite material layer was, the more enhanced the cycle performance tended to be. It is considered that the electron conduction paths formed with the CNT were capable of responding and following the volume change of the alloy-based negative electrode active material.

For No. 1 to No. 3, the higher the mass fraction of the CNT in the negative electrode composite material layer was, the more the storage capacity retention tended to decrease. In other words, the higher the mass fraction of the CNT in the negative electrode composite material layer was, the more the storage properties tended to decrease. It is considered that the addition of CNTs markedly increased the reaction area in the negative electrode composite material layer.

For No. 4 to No. 7, the presence of surfactant A in the negative electrode composite material layer (the negative electrode composite material slurry) tended to reduce the decrease in storage capacity retention. It is considered that surfactant A protected the surface of CNT. On the other hand, the presence of surfactant A in the negative electrode composite material layer tended to increase the initial direct-current resistance. It is considered that surfactant A inhibited the formation of contact points between the CNT and the negative electrode active material during the process of forming the negative electrode composite material layer.

For No. 8 to No. 11, the presence of surfactant A in the electrolyte solution tended to reduce the decrease in storage capacity retention. Further, there observed a resistance-decreasing effect of the CNT. It is considered that surfactant A protected the surface of CNT after contact points were formed between the CNT and the negative electrode active material.

For Nos. 12 and 13, the presence of surfactant B in the electrolyte solution tended to reduce the decrease in storage capacity retention. Both surfactant B and surfactant A are cationic, and include a quaternary ammonium salt.

For Nos. 14 and 15, the presence of surfactant C in the electrolyte solution tended to rather degrade the storage properties. Moreover, the addition of surfactant C to the negative electrode composite material slurry caused a minimal increase of the initial direct-current resistance. From these, it is considered that surfactant C tended not to adsorb on the CNT. Surfactant C is anionic, and includes a sulfonic acid salt.

ADDITIONAL STATEMENT

The present specification also discloses "A method of producing a non-aqueous electrolyte secondary battery".

The method of producing a non-aqueous electrolyte secondary battery according to the present technique includes the following (a) to (d):

(a) preparing a negative electrode composite material slurry by mixing a negative electrode active material, a CNT, a binder, and a dispersion medium;

(b) producing a negative electrode by applying the negative electrode composite material slurry to a surface of a negative electrode substrate;

(c) forming an electrode assembly that includes the negative electrode and a positive electrode; and (d) producing a battery by impregnating the electrode assembly with an electrolyte solution.

The electrolyte solution includes a solvent, a supporting electrolyte, and a cationic surfactant. The cationic surfactant includes a quaternary ammonium salt.

The negative electrode composite material slurry does not include a cationic surfactant.

The present embodiment and the present example are illustrative in any respect. The present embodiment and the present example are non-restrictive. The scope of the present technique encompasses any modifications within the meaning and the scope equivalent to the terms of the claims. For example, it is expected that certain configurations of the present embodiments and the present examples can be optionally combined. In the case where a plurality of functions and effects are described in the present embodiment and the present example, the scope of the present technique is not limited to the scope where all these functions and effects are obtained.

What is claimed is:

1. A non-aqueous electrolyte secondary battery, comprising:
   a positive electrode;
   a negative electrode; and
   an electrolyte solution, wherein
   the negative electrode includes a negative electrode composite material layer,
   the negative electrode composite material layer includes
      a negative electrode active material and
      a carbon nanotube,
   the electrolyte solution includes
      a solvent,
      a supporting electrolyte, and
      a cationic surfactant,
   the cationic surfactant includes a quaternary ammonium salt, and
   the quaternary ammonium salt is represented by a formula (II):

$$CH_3(CH_2)_n N^+(CH_3)_3 \cdot PF_6^- \qquad (II)$$

where
   n represents an integer from 7 to 15, and
   the negative electrode active material includes an alloy-based negative electrode active material, wherein the alloy-based negative electrode active material includes at least one selected from the group consisting of Si, Sn, Al, Cd, Sb, and Pb.

2. The non-aqueous electrolyte secondary battery according to claim 1, wherein
   the negative electrode composite material layer includes the carbon nanotube in a mass fraction from 0.2% to 0.4%.

3. The lithium-ion battery according to claim 1, wherein
   the alloy-based negative electrode active material includes Si.

4. A non-aqueous electrolyte secondary battery, comprising:
   a positive electrode;
   a negative electrode; and
   an electrolyte solution, wherein
   the negative electrode includes a negative electrode composite material layer,
   the negative electrode composite material layer includes a negative electrode active material and a carbon nanotube,
   the electrolyte solution includes a solvent, a supporting electrolyte, and a cationic surfactant,
   the cationic surfactant includes a quaternary ammonium salt,
   the negative electrode active material includes an alloy-based negative electrode active material,
   the alloy-based negative electrode active material includes at least one selected from the group consisting of Cd and Sb, and
   the quaternary ammonium salt is represented by a formula (II):

$$CH_3(CH_2)_n N^+(CH_3)_3 \cdot PF_6^- \qquad (II)$$

where
   n represents an integer from 5 to 15.

5. The lithium-ion battery according to claim 4, wherein
   the negative electrode composite material layer includes the carbon nanotube in a mass fraction from 0.2% to 0.4%.

* * * * *